April 20, 1965
R. LUCIEN ETAL
3,179,209
DISC BRAKE FOR VEHICLE WHEEL
Filed Sept. 22, 1961
2 Sheets-Sheet 1
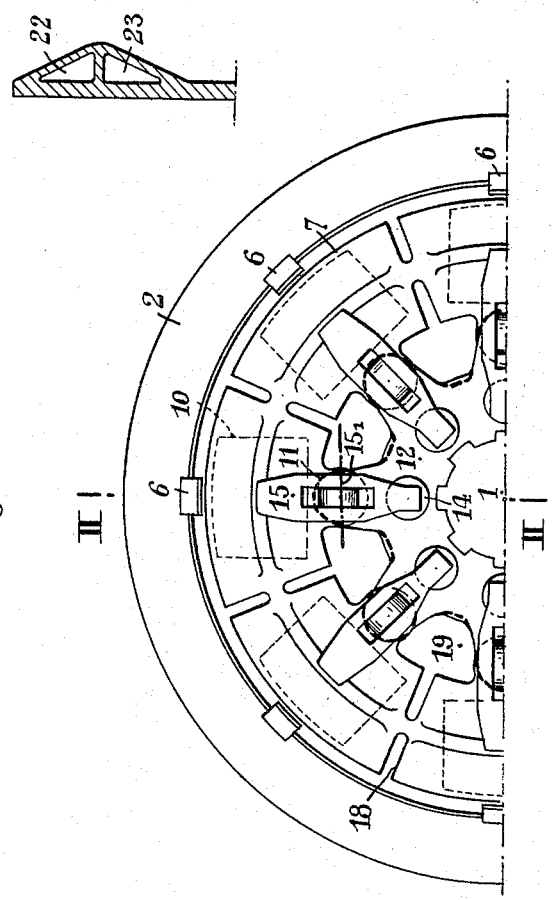

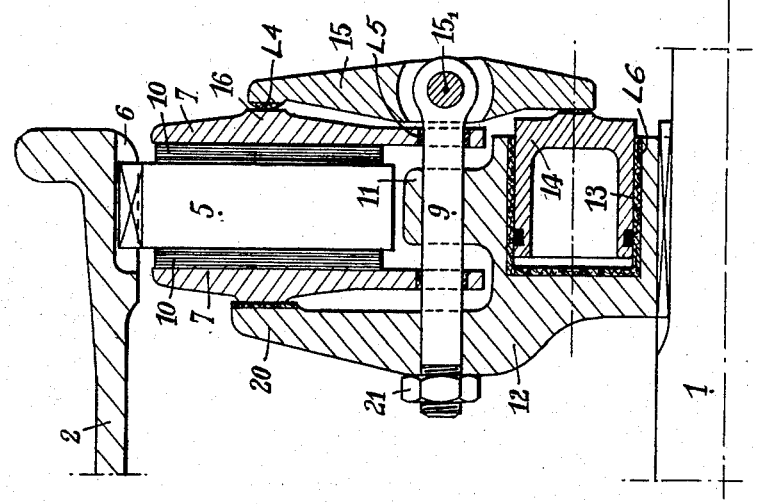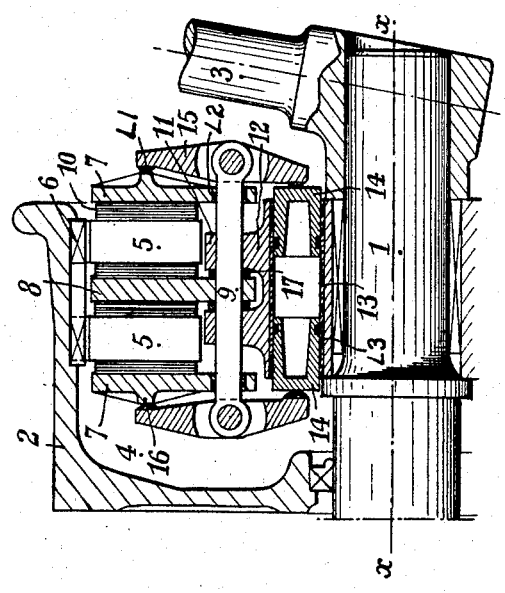

3,179,209
DISC BRAKE FOR VEHICLE WHEEL
René Lucien, 56 Blvd. Maillot, Neuilly sur Seine, France, and Jean Masclet, 11 Blvd. Davout, Paris, France
Filed Sept. 22, 1961, Ser. No. 140,011
Claims priority, application France, July 3, 1961, 866,810
9 Claims. (Cl. 188—72)

This invention relates to disc brakes.

The use of disc brakes for wheels is becoming more and more general for the equipment of vehicles and in particular for aircraft.

In the first constructions of such brakes, friction linings of conventional type were utilized for the linings intended to rub against the discs in rotation.

By reason of the poor heat conductivity of these linings, the equivalent in heat of the energy expended in braking was stored for the greater part in discs, which led to a multiplication of the number of discs and efforts to cool them to the greatest possible extent, in order to prevent too great an overheating of the said discs.

The poor conductivity of the linings did however have the advantage that, since their supports were not considerably heated, the transfer of heat to certain parts of the brake, such as hydraulic cylinders for actuating the braking, grease of the wheel hub, and so forth, was small. Thus, the disadvantages were avoided which would have resulted in a too great increase in their temperature.

Later, success was achieved in increasing the performances of disc brakes by utilizing friction linings capable of absorbing a part of the heat developed. The result was that a fraction of this quantity was absorbed by the adjoining parts of the structure. However, the proportion of energy dissipated in the form of heat and transmitted from the linings to the remainder of the structure was only a limited portion of the heat to be evacuated. This was due on the one hand to the form of construction and fixing of the lining to their supports, and on the other hand to the fact that a certain temperature should not be exceeded in the part of the brake fixed to the axle, this limitation being necessary in order to avoid the drawbacks indicated above, especially concerning the hydraulic actuating cylinders and the lubraction of the wheel hubs.

Even if the diffusion of a larger quantity of heat in the lining carriers had been tolerated, it would however have been necessary that this transmission should be effected fairly quickly, that is to say before the discs and/or the linings had been brought up to a temperature capable of damaging them.

Now, the method of assembly of the lining on their supports employed up to the present time does not permit a transmission of heat which is rapid enough to achieve this condition. In fact, especially with the object of facilitating the replacement of the linings, mechanical fixing means were employed: the conductive material of the linings is for example housed in cups which are themselves fixed to the lining carriers by mechanical means such as riveting. Now, these methods of fixation only provide an imperfect contact between the said cups and their supports, and there may therefore exist in the space a screen of air which is a bad conductor of heat.

In addition, even if the contact were perfect, the single fact of the discontinuity between the two elements creates an obstacle to the transmission from one to the other of the molecular agitation which, as is well known, governs the transmission of heat. In the end, this transmission will take place, but with insufficient rapidity to follow without delay the rise in temperature of the parts in frictional contact.

The brake in accordance with the invention is distinguished from the known brakes by the fact that all the restrictions to the evacuation of heat in the lining carriers imposed up to the present time either by the nature of the linings or by their method of assembly, are removed by the fact that a deliberate effort has been made in its construction to evacuate in the mass of the lining-carriers a preponderant proportion of the heat developed, and to apply to the said lining-carriers the cooling means which have heretofore been particularly applied to the discs; and finally to remove as far as possible from the parts brought up to high temperature, the portions of the actuating members of the brake for the operation of which a high temperature is detrimental.

The disc brake in accordance with the invention is characterized in that it is constituted by the combination of three units, each having its own function independent of those of the others, namely:

(a) A rotating unit formed by one or more discs, driven in rotation by the wheel and generating by friction on linings, heat to be dissipated, while itself storing a part of the said heat;

(b) An acting non-rotating unit having an axial displacement and carrying friction linings which are intimately fixed to it without discontinuity, especially by brazing, so as to ensure without delay due to the linings, the equalization of the temperature of this unit with that of the rotating unit, by transmission to the said unit of the heat created by the friction of the linings;

(c) A support of light construction and separate from the two units, which couples the non-rotating unit to the axle, is thermally insulated with respect to the two units and comprises the actuating members of the brake.

This combination of units makes it possible, by a suitable selection of the features of the discs (or disc) and of the active non-rotating unit (linings and their supports) to obtain the result that the assembly is subjected to the same rise in temperature in the course of the braking. Owing to this transmission and optimum distribution of heat, the weight of the brake will be minimal, for the same power, when compared with known brakes.

This result is made possible by the thermal insulation of the hydraulic portion as well as by the fact that the active non-rotating unit is constituted by articulated units of simple shape, which promote distribution of heat.

One result of the invention is to create a brake in which, in almost every case, the number of the discs is limited to one only or exceptionally to two discs, without however excluding from the invention multi-discs brakes in the extreme cases when these latter are necessary.

The invention has the further advantage of creating a brake which is simple, robust, easy to maintain, and which, because it comprises a very small number of discs, avoids the tendency of multi-disc brakes to initiate vibration in the landing gear of aircraft.

Still a further advantage of the invention is that, by virtue of the reduction of the number of discs, the weight of the rotating portion is reduced and thereby the inertia forces generated are smaller.

The metal of the active non-rotating unit is selected from those which combine the optimum qualities of heat capacity and conductivity, the characteristics of its behaviour in the hot state ensuring, at the extreme utilization temperatures, the mechanical strength necessary for the rigidity of the whole assembly and for the transmission of the torque. Amongst these metals, beryllium and its alloys occupy a high place.

The support providing the fixation to the axle surrounds this latter. It contains the control cylinders and their pistons which transmit the braking power to the lining supports by means of rocking levers. This arrangement makes it possible to place the elements of the transmission which are sensitive to temperature at a fairly large distance from the parts which are brought up to high temperature. Without interfering with the correct operation of these elements, it is thus possible to permit the assembly of the linings and supports to reach a temperature substantially equal to that of the discs themselves. This support will advantageously be constructed of light alloy which is a good conductor of heat, such as magnesium-thorium. By construction, it only represents a small part of the total weight. When so required, this support can be protected by appropriate heat insulators against a rise in temperature of the two units due to the heat of the two units.

By reason of the fact that the non-rotating parts can be brought by friction up to red heat, both in the linings and their supports, the invention provides a protection for the wheel from the radiated heat. This can be obtained by a shell of metal sheet (of titanium for example) which follows the shape of the housing of the brake in the wheel and is placed apart from the latter so as to form in the space a cushion of air; this can be put into circulation by employing centrifugal force.

With the same object, a heat-insulating covering can be associated with the shell.

The lining carriers in which passes a portion of the heat developed by the energy absorbed being fixed or substantially so, since at the most they are only subjected to very small movements of translation to bring them up to the discs, it is easy to cool them by an known means.

They may for example be provided externally with fins for cooling them by convection, using the flow of air created by the speed of the vehicle, or by any other ventilation means.

The invention also provides for the arrangement in the support of cavities through which passes a cooling fluid. The connection of these cavities to an inlet conduit and an outlet conduit for the fluid does not present any difficulty by reason of the almost complete immobility of the supports.

For the absorption of heat, it is also possible to utilize the melting of certain salts or the vaporization of a mass of liquid contained in cavities of the support, provided for that purpose.

According to the invention, the proportion of the volumes of the linings and their supports will be determined by taking account of their physical characteristics, so that the temperature of the whole assembly may be as uniform as possible, and substantially that of the discs themselves.

Other characteristics of the invention will become apparent from the description given below of two forms of construction of brakes, one for a brake with two discs and the other for a single disc brake, applied to an aircraft wheel.

The first form of embodiment is shown in FIGS. 1 and 2, respectively in half end view and in half axial cross-setion; the second is shown in FIG. 3 in half axial coss-section; FIG. 4 shows in partial axial cross-section a detail of a lining support arranged for improved cooling.

In these figures, 1 represents the stub axle of the wheel 2, the latter being shown in part only in FIGS. 1 to 3. The axle 1 is fixed on the end of a leg 3 of the landing gear.

The description will first be given of a brake with a double disc, with reference to FIGS. 1, 2 and 4.

In a cavity 4 formed in the rim, the brake comprises two discs 5 which are made fast for rotation with the wheel by means of slides 6, along which they are capable of being moved parallel to the axis of the wheel. On each side of the discs are arranged lining supports 7, 7 and 8 engaged on rods 9, equidistant from each other and from the axis $x$—$x$ of the stub-axle. These rods pass through extensions 11 of an annular unit 12 rigidly fixed to the axle 1. On the lining supports 7, 7 and 8 there are fixed without discontinuity, by brazing for example, brake linings 10 of the calcined type, with a base of a metal which is a good conductor of heat, such as copper for example.

In accordance with the invention, the supports 7, 7 and 8 are beryllium. The linings have preferably the form shown in FIG. 1, that is to say they are each limited by a circumference close to the outer edge of the supports by two straight symmetrical lines parallel to the central radius and by a straight line perpendicular to those previously mentioned.

The outer supports 7 are provided with a lining on their inner faces, and the intermediate support 8 has a lining on each of its faces.

In the unit 12 are provided bores 13 which serve as cylinders for oppositely-acting pistons 14. On each extremity of the rods 9 is mounted a rocking lever 15, oscillating about an axis $15^1$ and having curved surfaces opposite the pistons and facing bosses 16 formed on the back face of the supports 7 facing the centers of surface of the linings. The admission of air under pressure to the cylinders between the two pistons causes the rocking levers 15 to be applied against the bosses 16, and in consequence the displacement of the supports 7 in the direction of the intermediate support 8, which is held fixed by rings 17. This results in friction of all the linings 10 on all the discs 5. In order to enable the linings to be applied by their whole surface against the discs, in spite of defects of flatness, the supports are given a certain flexibility between the linings; this flexibility is ensured, for example, by cut-away portions such as 18 and 19.

In the single disc brake of FIG. 3, there is again found a disc 5 movable axially along slides 6. In this brake, there is provided a single piston 14 for each brake unit; this piston is movable in a blind cylinder 13, formed in the unit 12. The extensions 11 are traversed by rods 9 which are locked by means of nuts 21. Each rod 9 comprises in this case a single rocking lever 15, one extremity of which is movable in the direction of the disc 5 under the action of the piston 14 acting on the other extremity of the rocking lever. The supports 7 are of beryllium and their linings 10 are brazed on the supports. The thrust of the rocking lever against the adjacent support 10 displaces it, together with the disc 5, in the direction of the support 7 which is held stationary by the abutment 20. The two linings are thus put into frictional contact with the disc.

FIG. 4 shows by way of example a lining support 7 provided with cavities 22 and 23 for the circulation of a cooling fluid, liquid or gaseous, or for containing a salt which melts at the temperature to which the supports are brought, or alternatively a liquid which vaporizes at that temperature.

In both of the aforesaid embodiments, insulating elements of suitable materials can be employed to prevent heat flow. Insulating elements L1, L2 and L3 in FIG. 2, and elements L4, L5 and L6 in FIG. 3 will serve this purpose.

The proposal to utilize the lining-carrier as a mass for receiving heat and of constituting this mass by beryllium enables the utilization of beryllium as the raw material of the discs to be abandoned for the manufacture of light disc brakes. It is known that the use of this metal for the discs is dangerous because the friction to which they are subjected during braking has the effect of producing dust which is really poisonous. In order to avoid this danger, the beryllium has to be covered with another material, a difficult and costly process which causes the utilization of beryllium to lose a great part of its advantage. Such a danger is not to be feared with the use of beryllium as a lining carrier in the brake according to the invention, since this metal is not subjected to any friction.

It will of course be understood that the forms of embodiment described above may comprise many alternative forms, and are given by way of non-limitative examples.

What we claim is:

1. A disc brake for the wheel of a vehicle which is rotatable about an axle, said brake comprising: at least one disc connected to the wheel for rotation therewith about an axis passing through said axle, said disc being connected to the wheel for relative axial movement, lining supports on both sides of the disc, means supporting at least one of said lining supports for bodily axial displacement towards and away from the disc, friction linings connected directly to the supports in face-to-face contact, a block coaxially secured to said axle and immovable with respect to the wheel, said means which supports said lining supports being in turn supported by said block, control means supported on said block for displacing at least the said one lining support towards and away from the disc, a hydraulic piston and cylinder arrangement supported in said block and in operative engagement with the control means to activate the same, said lining supports being constituted of a material having high heat capacity for absorbing heat energy developed by the contact of the linings with the disc, said friction linings being constituted of material having high thermal conductivity to promote transfer of heat to the lining supports, the direct connection of the friction linings to the supports in face-to-face contact further promoting heat transfer from the linings to the support, said hydraulic piston and cylinder arrangement comprising means defining a cylinder in said immovable block proximate the axle and remote from the lining supports and the disc, a piston displaceable in the cylinder, said control means comprising radially extending pivotally connected levers having one end in contact with the piston and an opposite end in contact with at least said one lining support to displace the latter in correspondence with the displacement of the piston in the cylinder, said block including an annular extension projecting towards the disc, said means which supports the lining supports for bodily axial displacement comprising rods supported in said extension, said lining supports being supported on the rods for axial displacement therealong, said control means comprising pivotally connecting the levers to the rods at a location between the ends of the levers.

2. A disc brake as claimed in claim 1, in which said lining supports are constituted by a metal of high calorific capacity per unit mass and retaining at high temperature quantities of mechanical strength insuring the rigidity of the whole assembly and the transmission of the braking torque.

3. A disc brake as claimed in claim 2, wherein said lining supports are constituted of beryllium.

4. A disc brake as claimed in claim 2, wherein said lining supports are constituted of a beryllium alloy.

5. A disc brake as claimed in claim 1, wherein the lining supports are corcumferential members having local cut-away portions, thereby providing flexibility for the lining supports.

6. A disc brake as claimed in claim 1, in which the thermally effecetive volumes of the linings and their supports is substantially equal to that of the discs.

7. A disc brake as claimed in claim 1 wherein said means pivotally connecting the levers to the rods comprises a shaft at an extremity of each of the rods, each shaft supporting a corresponding lever for pivotal movement therearound.

8. A disc brake as claimed in claim 1 comprising heat insulation means insulating the block from the heat developed by the discs and linings.

9. A disc brake as claimed in claim 1 wherein said lining supports are provided with cavities and means in said cavities for absorbing heat.

References Cited by the Examiner

UNITED STATES PATENTS

| | | | |
|---|---|---|---|
| 2,115,083 | 4/38 | Pierce | 188—73 |
| 2,534,643 | 12/50 | Warner | 29—494 |
| 2,672,956 | 3/54 | Webb et al. | 188—73 |
| 2,701,626 | 2/55 | Walther | 188—72 |
| 2,754,936 | 7/56 | Butler | 188—73 |
| 2,757,761 | 8/56 | Milan | 188—72 |
| 2,770,033 | 11/56 | Zarth | 29—494 |
| 2,801,714 | 8/57 | Dotto | 188—251 X |
| 2,866,886 | 12/58 | Koehring | 188—234 |
| 2,916,105 | 12/59 | Dasse et al. | 188—18 X |
| 2,989,153 | 6/61 | Boulet | 188—73 |
| 2,997,312 | 8/61 | Muller et al. | 188—264 X |

FOREIGN PATENTS 1,194,525 5/59 France.

ARTHUR L. LA POINT, *Primary Examiner.*

A. JOSEPH GOLDBERG, EUGENE G. BOTZ,
*Examiners.*